(12) United States Patent
Chen

(10) Patent No.: US 6,643,457 B2
(45) Date of Patent: Nov. 4, 2003

(54) SIMPLE FOCUSABLE LENS COMBINATION OF A CAMERA

(76) Inventor: Wen Ching Chen, P.O. Box 2103, Taichung (TW)

( * ) Notice: Subject to any disclaimer, the term of this patent is extended or adjusted under 35 U.S.C. 154(b) by 0 days.

(21) Appl. No.: 10/107,734

(22) Filed: Mar. 28, 2002

(65) Prior Publication Data

US 2003/0185551 A1 Oct. 2, 2003

(51) Int. Cl.[7] ................................................ G03B 13/32
(52) U.S. Cl. ........................ 396/74; 348/360; 348/345
(58) Field of Search ............................. 396/74, 75, 73; 348/240.3, 240.99, 240.1, 64, 345, 360, 361

(56) References Cited

U.S. PATENT DOCUMENTS

| 3,185,061 A | * | 5/1965 | Westphalen | .................. 396/74 |
| 3,479,942 A | * | 11/1969 | Land et al. | .................... 396/73 |
| 6,134,393 A | * | 10/2000 | Melman | .................... 348/64 X |

* cited by examiner

Primary Examiner—W. B. Perkey

(57) ABSTRACT

A simple focusable lens combination of a camera including a housing formed with a lens hole. A photosensor and a base board are disposed in the housing. The base board is movably disposed in the housing. Multiple lenses with different focal lengths are disposed on the base board. By means of moving the base board, one of the multiple lenses is selected to aim at the lens hole for focusing images of different distances onto the photosensor.

3 Claims, 5 Drawing Sheets

SIMPLE FOCUSABLE LENS COMBINATION OF A CAMERA

BACKGROUND OF THE INVENTION

The present invention is related to a simple focusable lens combination of a camera. Multiple lenses with different focal lengths are directly disposed on a base board in the housing of the camera. By means off moving the base board, one of the multiple lenses is selected to change the focal length.

FIG. 8 shows a conventional focusing mechanism for the lens of a camera. The focusing mechanism includes a rack 91 fixed on the lens 92 and extending along the axis of the lens.

A slide sleeve 93 is fitted around the lens and extends along the axis of the lens, whereby the lens can axially move. A worm 94 is disposed on outer side of the slide sleeve 93 in parallel thereto. The worm is coupled with a driving mechanism (not shown) and driven thereby. The slide sleeve 93 is formed with a split 931 corresponding to the worm, whereby the rack 91 can mesh with the worm 94.

The driving mechanism drives the worm 94 to rotate. Via the rack 91, the lens is driven to move along the slide sleeve so as to adjust the focal length.

An additional fixed lens is disposed in the housing of the camera in cooperation with the lens 92. The driving mechanism is generally composed of multiple transmission gears. After the lens 92 is moved, the focus thereof still must be aimed at the focus of the fixed lens. Therefore, the transmission gears require high precision of cooperation. In consideration of cost, such complicated and relatively precise focusing mechanism is not suitable for cheap camera.

Moreover, in the case that the lens is protruded for elongating the focal length, the lens is easy to be incautiously collided and damaged.

SUMMARY OF THE INVENTION

It is therefore a primary object of the present invention to provide a simple focusable lens combination of a camera for lowering manufacturing cost of the focusing mechanism of the camera. Multiple lenses with different focal lengths are disposed on a base board in the housing of the camera. By means of moving the base board, a suitable lens of the multiple lenses is selected to aim at the lens hole for shooting. The lens is no more necessary to cooperate with other fixed lens so that the entire focusing mechanism is simplified. This lowers manufacturing and assembling cost and a user can get an ideal picture with a cheaper camera.

It is a further object of the present invention to provide the above simple focusable lens combination of a camera in which the housing has no excessively protruding section. Therefore, the camera is not subject to damage due to collision and the using life of the camera is prolonged.

The present invention can be best understood through the following description and accompanying drawings wherein:

DETAILED DESCRIPTION OF THE PREFERRED EMBODIMENTS

Figure 1:
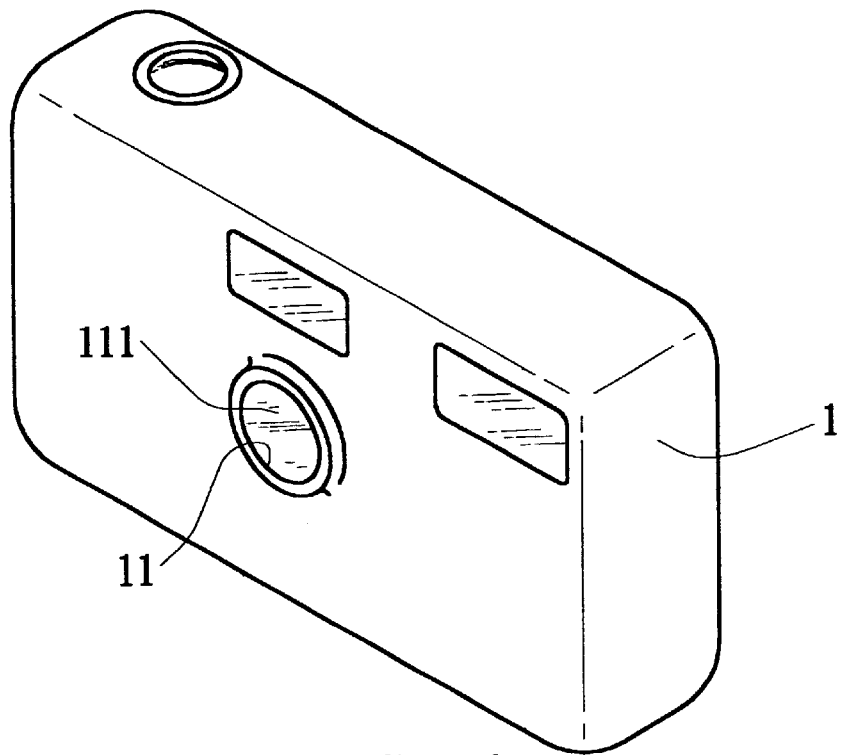
FIG. 1 is a perspective assembled view of the camera of the present invention.
Figure 2:
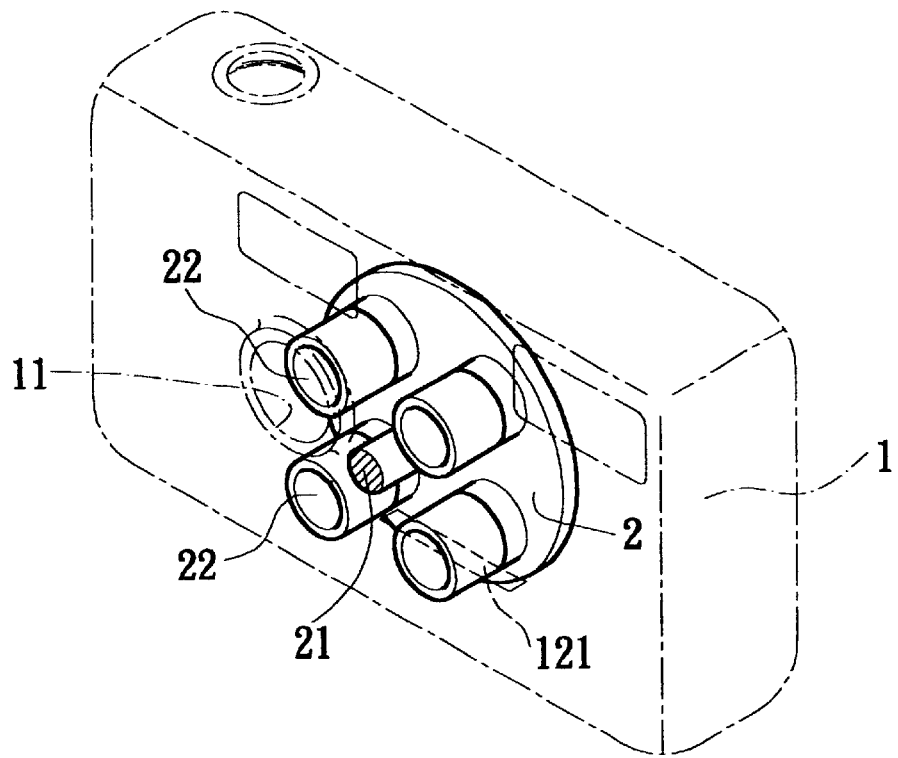
FIG. 2 is a perspective view showing the focusable lens combination of the present invention.
Figure 3:
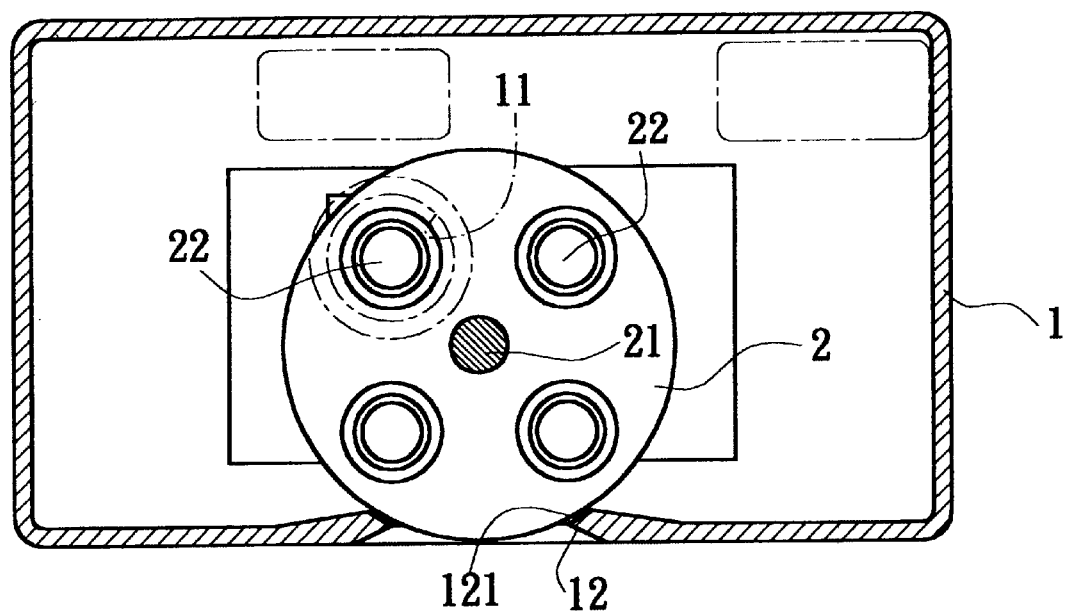
FIG. 3 is a front view of the present invention.

Please refer to FIGS. 1 to 4. The present invention discloses a simple focusable lens combination of a camera. The camera has a housing 1 formed With a lens hole 11. A transparent lens 111 with unified thickness is disposed in the lens hole 11, whereby the light beam can pass through the lens 111 into the housing 1. A photosensor 13 is disposed in the housing 1 on one side of the lens hole for recording the image of the light beam projected into the housing 1.

A base board 2 is disposed in the housing. The base board is circular and has a shaft 21 at the center. The base board is rotatably disposed in the housing via the shaft 21. Multiple lens combinations 22 within different focal lengths are disposed on the base board 2. The lens combinations are annularly arranged at equal intervals about the shaft 21. By means of rotating the base board, the lens combinations 22 can be aimed at the lens hole 11.

The bottom face of the housing 1 is formed with a recessed section 12 having an opening 121 corresponding to the outer circumference of the base board 2. The outer circumference of the base board partially protrudes through the opening 121 and is exposed to outer side of the housing 1 for a user to shift.

When changing focal length, a user can shift the outer circumference of the, base board 2 and turn the same so as to select a lens combination 22 with suitable focal length and aim the lens combination with the lens hole 11. Accordingly, the shot image can be focused on the photosensor 13 to obtain clear image.

According to the above arrangement, only a simple lens 111 with unified thickness is mounted in the lens hole 11. (The light beam passing through the lens 111 is not focused.) Moreover, the lens combination is no more necessary to cooperate with other fixed lens so that the entire focusing mechanism is simplified. This lowers manufacturing land assembling cost and the user can also get an ideal picture with a cheaper camera.

Figure 4:
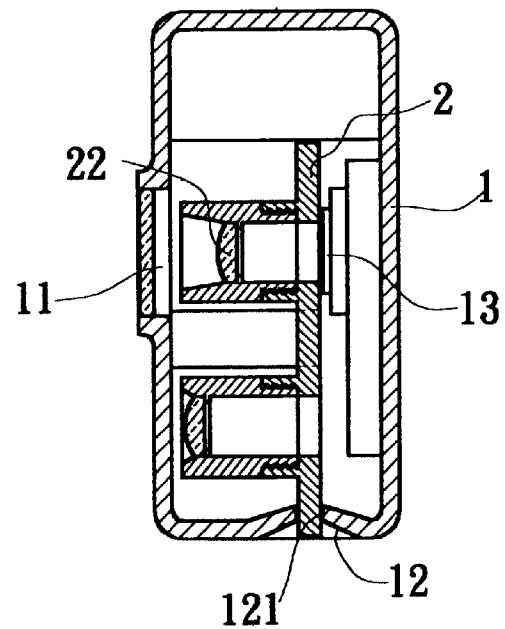
FIG. 4 is a side view of the present invention.

Furthermore, referring to FIGS. 1 and 4, the base board 2 is turned within the housing to adjust the focal length. Therefore, the housing has no protruding section which is subject to damage due to collision.

Figure 5:
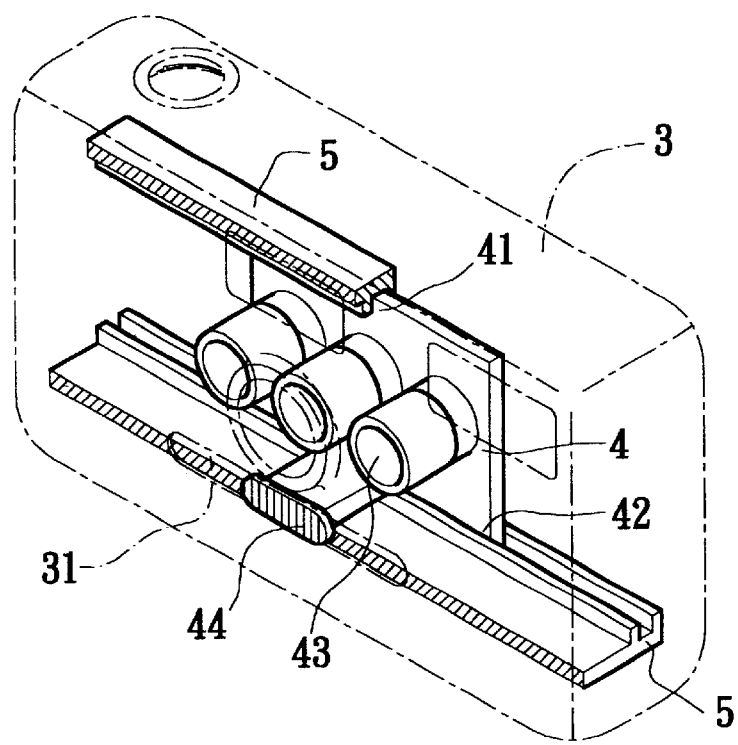
FIG. 5 is a perspective view of a second embodiment of the present invention.
Figure 6:
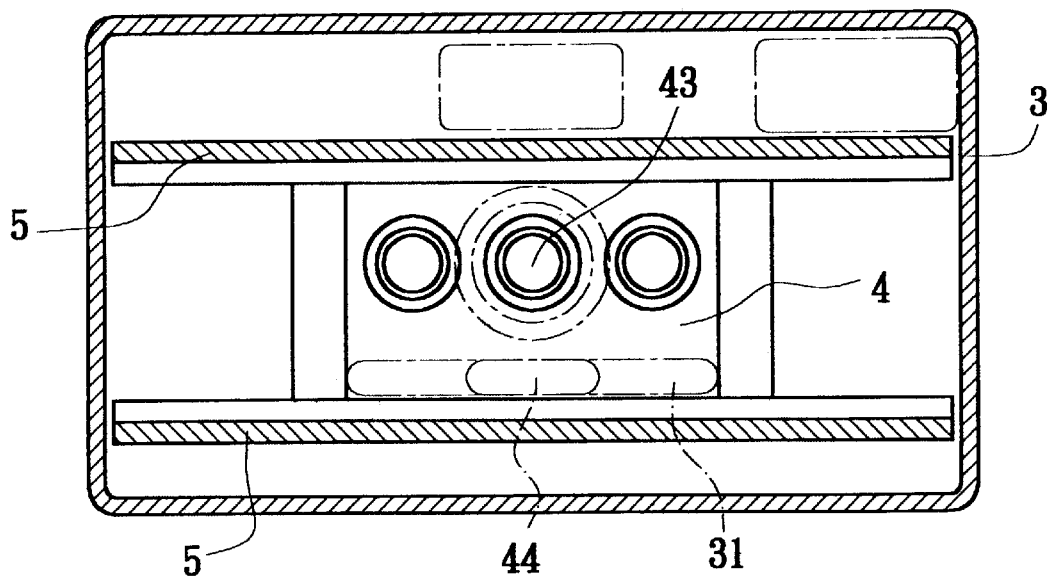
FIG. 6 is a front view of the second embodiment of the present invention.
Figure 7:
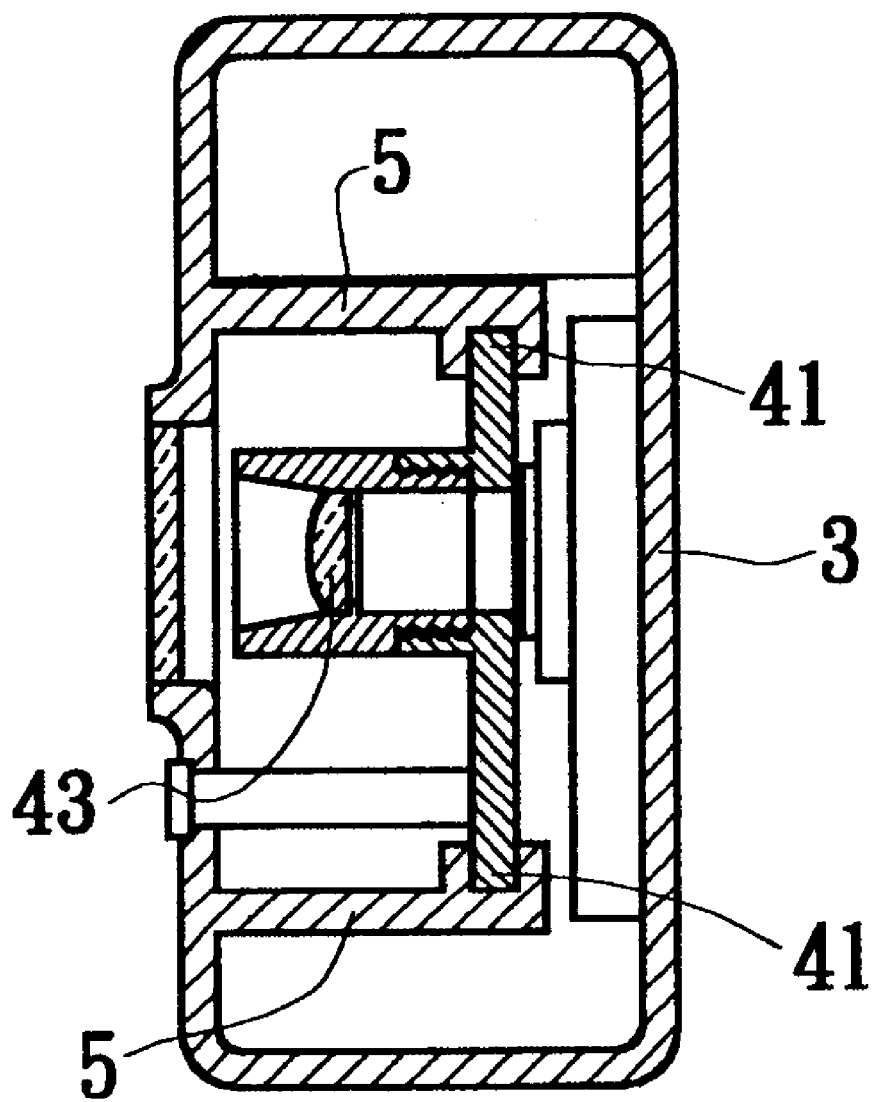
FIG. 7 is a side view of the second embodiment of the present invention.
Figure 8:
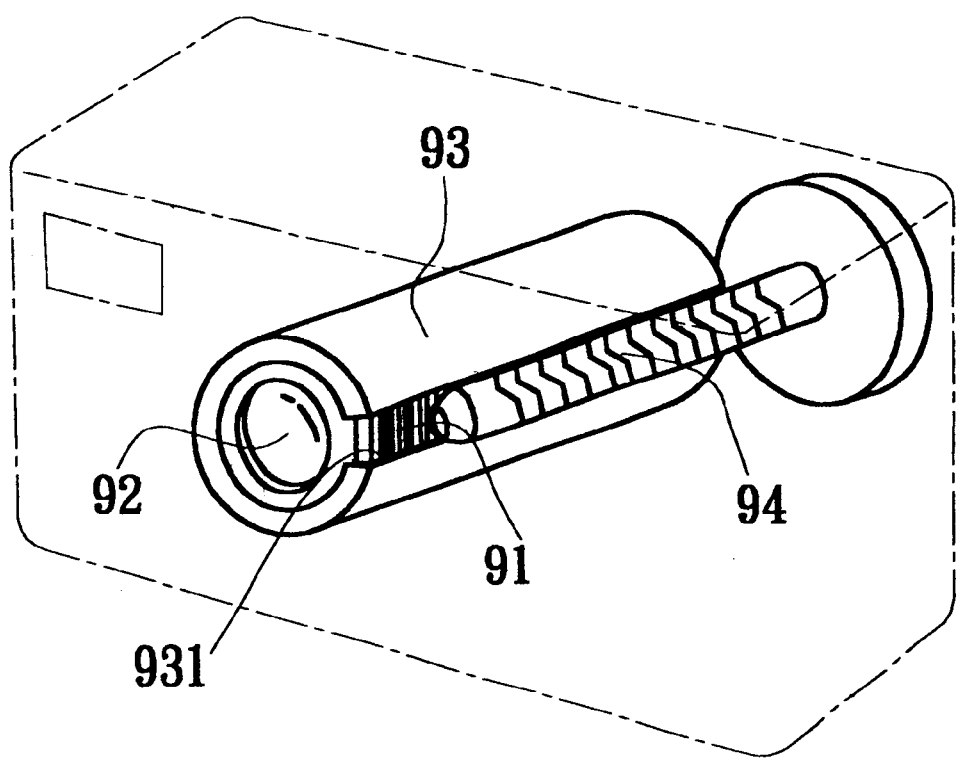
FIG. 8 is a perspective view of a conventional focusing mechanism of a camera.

FIGS. 5 to 7 show a second embodiment of the present invention, in which the base board 4 is rectangular and has an upper side 41 and a flower side 42 parallel to the upper side 41. Two slide rails 5 are disposed in the housing 3 respectively corresponding to the two sides 41, 42. The two sides are respectively inserted in the slide rails, whereby the base board 4 can linearly move along the slide rails.

Multiple lenses 43 with different focal lengths are disposed on the base board 4. The lenses are linearly arranged at equal intervals in the moving direction of base board. The front face of the housing 3 is formed with a slot 31 in parallel to the slide rails. The base board has a shift bar 44 protruding from the slot. A user can shift the shift ball to move along the slot so as to drive the base board. Accordingly, a lens can be selected to aim at the lens hole for shooting.

The above embodiments are only used to illustrate the present invention, not intended to limit the scope thereof. Many modifications of the above embodiments can be made without departing from the spirit of the present invention.

What is claimed is:

1. A simple focusable lens combination of a camera comprising:

a housing formed with a lens hole, whereby a light beam can be projected through the lens hole into the housing, the housing includes a bottom formed with a recessed section and an opening defined in the recessed section;

a photosensor disposed in the housing for recording the image of the light beam projected, into the housing; and a base board movably disposed in the housing, multiple lens with different focal lengths being disposed on the base board, whereby by means of moving the base board, one lens of the multiple lenses is selected to aim at the lens hole for focusing images of different distance onto the photosensor, the base board including an outer circumference corresponding to the opening in the recessed section of the housing and partially protruding through the opening for a user to shift.

2. The simple focusable lens combination of a camera as claimed in claim 1, wherein the base board is rotatably disposed in the housing.

3. The simple focusable lens combination of a camera as claimed in claim 2, wherein the base board is circular and has a shaft at the center, the base board being rotatably disposed in the housing via the shaft, the multiple lenses being annularly arranged at equal intervals about the shaft.

* * * * *